Dec. 7, 1937.  H. M. PRYALE ET AL  2,101,508
APPARATUS FOR MANUFACTURING MATS
Filed March 22, 1934   5 Sheets-Sheet 1
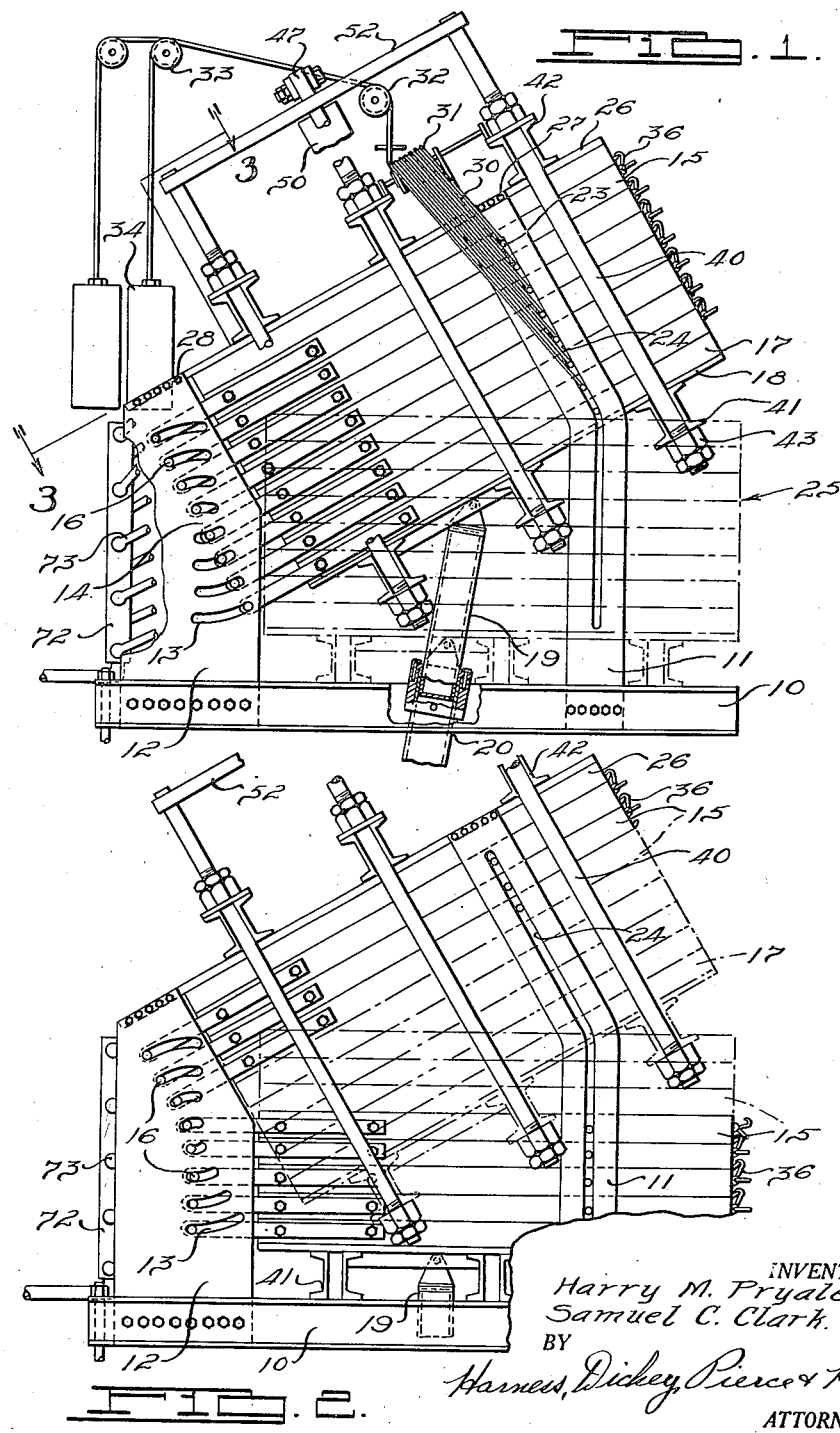
INVENTORS.
Harry M. Pryale,
Samuel C. Clark.
BY
ATTORNEYS.

Dec. 7, 1937.  H. M. PRYALE ET AL  2,101,508
APPARATUS FOR MANUFACTURING MATS
Filed March 22, 1934  5 Sheets-Sheet 2

INVENTORS.
Harry M. Pryale,
Samuel C. Clark.
BY
Harness, Dickey, Pierce & Hann.
ATTORNEYS.

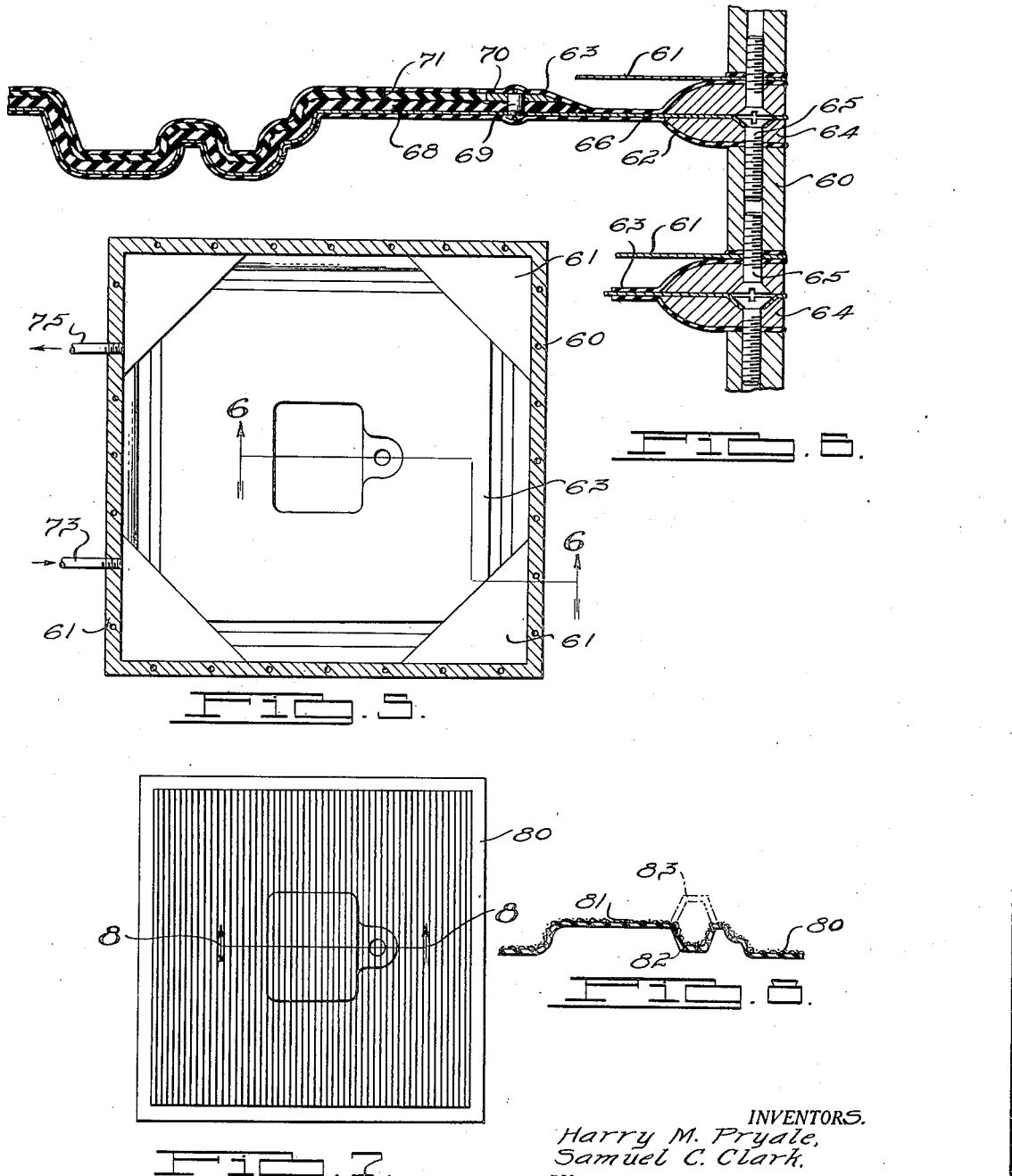

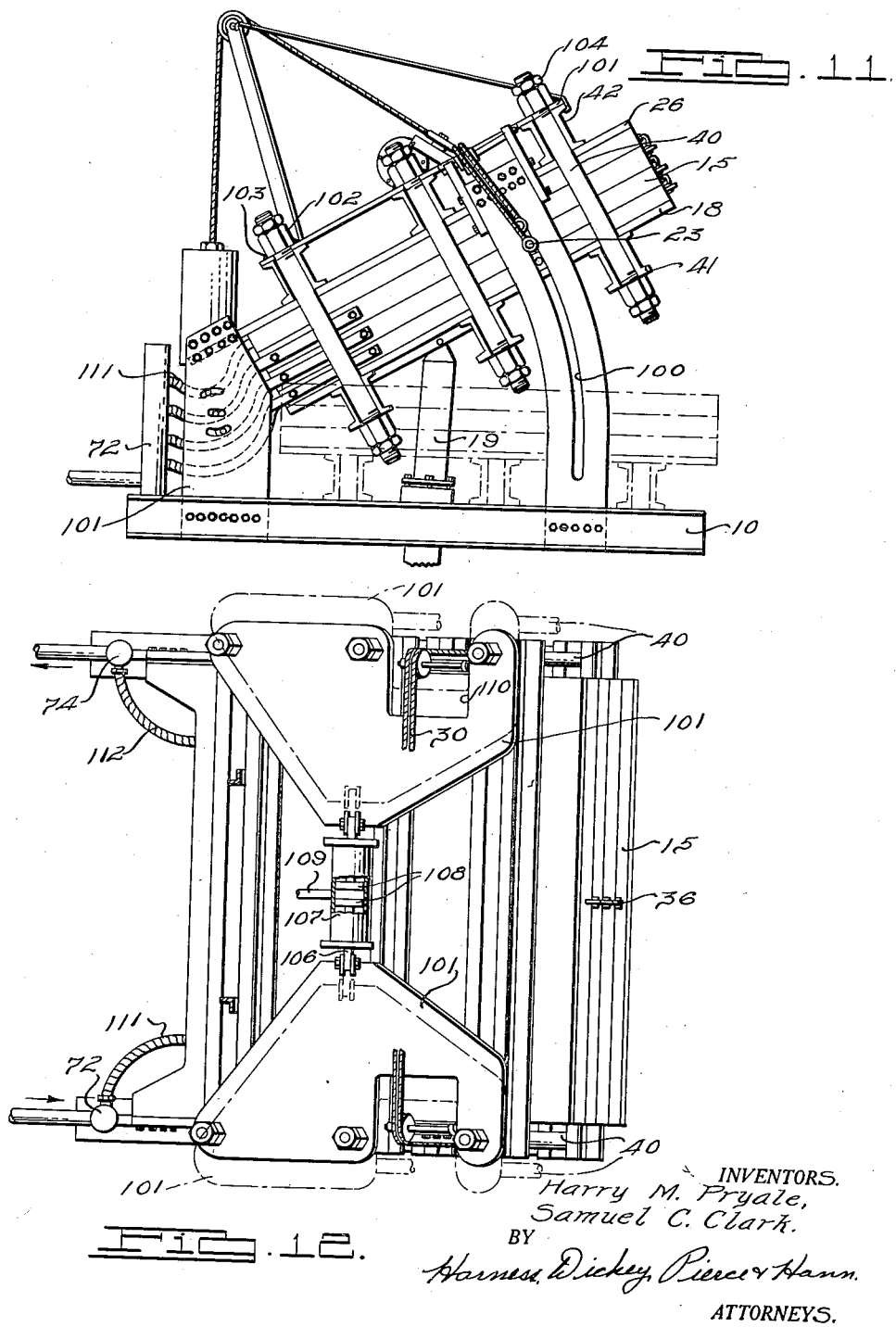

Patented Dec. 7, 1937

2,101,508

UNITED STATES PATENT OFFICE 2,101,508

APPARATUS FOR MANUFACTURING MATS

Harry M. Pryale and Samuel C. Clark, Pontiac, Mich., assignors to Baldwin Rubber Company, Pontiac, Mich., a corporation of Michigan Application March 22, 1934, Serial No. 716,772

14 Claims. (Cl. 18—17)

The invention relates to the manufacture of mats or the like composed of rubber compound and has particular relation to a mat construction and a molding apparatus for molding and vulcanizing mats.

One object of the invention is to provide a highly efficient and economical apparatus for vulcanizing a plurality of mats or the like at the same time and which insures uniformity in the products obtained.

Another object of the invention is to provide a molding apparatus for molding and vulcanizing mats or the like which is so constructed and designed that it is light in weight as compared to ordinary molding apparatus even though steam under fairly high pressure is employed as a vulcanizing medium.

Another object of the invention is to provide a multiple mold for manufacturing mats or the like which may be readily manipulated by a single operator and which in fact is so designed that one operator may take care of a number of molding apparatus of the same character.

Another object of the invention is to provide an improved apparatus for manufacturing a mat having an irregular contour, from a plane sheet of rubber compound.

Another object of the invention is to provide an improved method of vulcanizing rubber articles which enables using a light and inexpensive apparatus.

Another object of the invention is to provide a method of manufacturing a mat or the like with a hollow portion directed from one side thereof.

Another object of the invention is to provide an improved mat construction having a preformed contour adapted particularly to accommodate portions of the engine transmission projecting above the floor of the automobile.

Another object of the invention is to provide an apparatus and method of molding rubber articles which will eliminate the usual trim and consequently eliminate operations subsequently necessary to remove the trim.

Other objects of the invention will become apparent from the following description taken in conjunction with the drawings and from the claims hereinafter set forth.

For a better understanding of the invention reference may be had to the drawings, wherein:

Figure 1 is a side elevational view of a molding apparatus constructed according to one form of the invention.

Fig. 2 is a fragmentary view of the construction shown by Fig. 1 with several of the mold sections or decks in their inoperative or lower positions.

Fig. 5 is a cross-sectional view through one of the individual decks.

Fig. 6 is a cross-sectional view on a larger scale taken substantially along the line 6—6 of Fig. 5.

Fig. 7 is a plan view illustrating a mat constructed according to one form of the invention and which may be produced by using the molding apparatus illustrated.

Fig. 8 is a fragmentary cross-sectional view taken substantially along the line 8—8 of Fig. 7.

Fig. 11 is a view similar to Fig. 1 illustrating a molding apparatus constructed according to another form of the invention.

Fig. 12 is a plan view of the construction shown by Fig. 11.

Figures 3, 4:
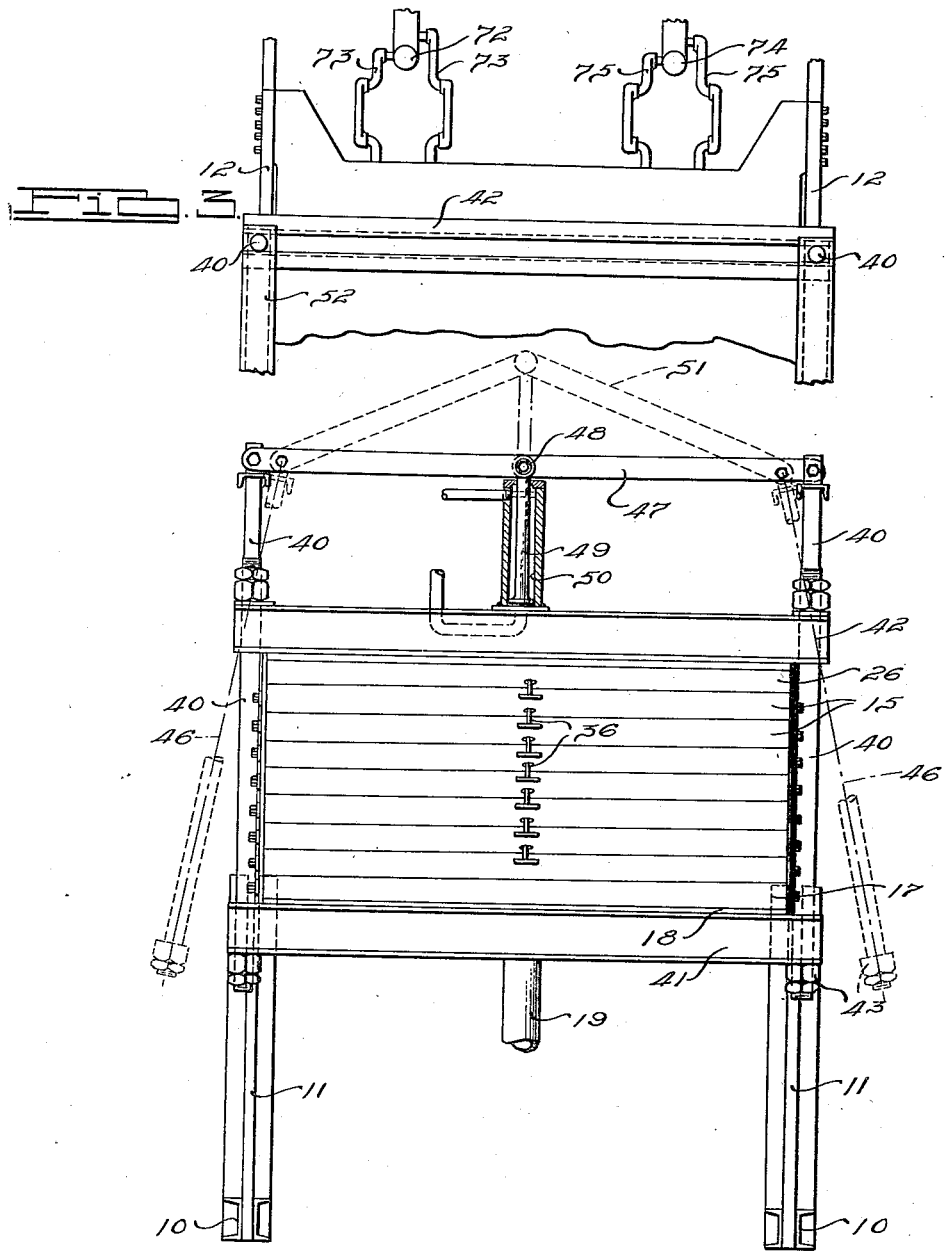
Fig. 3 is a cross-sectional view taken substantially along the line 3—3 of Fig. 1.
Fig. 4 is a front elevational view of the construction shown by Fig. 1.

Referring to Figs. 1 and 2, the apparatus illustrated includes a base 10, a pair of front uprights 11 disposed at opposite sides of the base respectively, and a pair of rear upright plates 12 also disposed at opposite sides of the base respectively. Each of the upright plates 12 has a series of arcuate slots 13, eight slots being shown in the present construction, which are substantially curved about a center or axis 14 located between the fourth and fifth slots with the slots gradually becoming longer away from the axis. The slots serve as pivotal supports for a plurality of movable mold sections or decks 15 which have bars provided with pins 16 projecting into the slots. The lower mold section or deck indicated at 17 is joined to a crown plate 18 which is pivotally connected substantially at its center and at its lower side to a plunger 19 which is reciprocatory in a fluid pressure cylinder 20 that may be pivotally mounted on the frame 10 or on a stationary support within the frame. The plunger 19 is used to raise the lower deck and crown plate and to apply upward pressure against the crown plate to bring the decks into close relation as will be readily understood.

At their forward ends, opposite sides of each of the movable mold decks have pins 23 which project into guide slots 24 provided in the uprights 11 and in this connection it will be noted that the uprights 11 are angled at their upper ends and that the slots correspondingly are angled. This arrangement of slots in conjunction with the slots 13 for pivotally supporting the decks permits free pivotal movement of the latter from the lower and substantially horizontal positions shown at 25 in broken lines to the upper and oblique positions shown in full lines. In this connection it may be noted that the oblique, operative position of the decks is desirable so as to facilitate drainage of moisture such as that resulting from condensation during the vulcanizing operation while the horizontal position of the decks is desirable when mats are to be removed and replaced between the decks. While the decks mentioned are movable from oblique to horizontal positions, the upper deck is secured to a crown plate 26 which is stationary and is secured to the uprights 11 and 12 by bolts as indicated at 27 and 28. The two positions are desirable for operating decks so as to provide space for removal and replacement of material to be cured.

For generally counter-balancing the movable decks 15 excepting the lower deck 17, cables 30 are fastened respectively to the pins 23 and are trained over grooved rollers 31 and 32 which may be suitably supported on the upper crown plate 26 and then the cables are directed downwardly over rollers 33 and are secured to counterweights 34. Preferably, the decks are slightly heavier than the counter-weights so that they will move to the horizontal position shown at 25 by gravity while still permitting the operator to easily lift them to their oblique and operative positions. For the purpose of releasably fastening the upper and first of the movable decks 15 to the stationary deck and crown plate 26 and for holding the second movable deck releasably latched to the first and so on, manually operable latches 36 may be provided. From this it will be understood that when the crown plate 18 and the lowermost deck 17 are moved downwardly, the other movable decks still will be held in position by the latches and that each of the movable decks then may be released individually by releasing the latch holding it to the deck above it. This permits the operator to move each deck upwardly and downwardly individually.

When the mold sections or decks are in their oblique positions it is of course necessary to hold them very strongly when fluid under pressure is introduced into the decks as this pressure over great areas becomes very large. So holding of the decks together and the upper and lower crown plates particularly with the movable decks between them, is accomplished by a plurality of long bolts 40 that may move into slots between the ends of channel beams 41 and 42 extending transversely of the lower and upper crown plates respectively. Each of these bolts has locking and adjusting nuts 43 adapted to be disposed at the opposed sides of the channel beams 41 and 42 so that when the bolts are in operative position, pressure within the decks will not separate them as the locking and adjusting nuts will prevent separation of the beams 41 and 42 and hence the crown plates. Ordinarily it is not necessary that the locking nuts 43 engage the beams before fluid under pressure is introduced into the decks as a slight clearance may be permitted which of course is taken up when the fluid under pressure is introduced. This slight play when there is no fluid under pressure in the decks, permits lateral movement of the bolts to positions indicated at 46 in Fig. 4 which permits separation of the decks and their movement to the lower and horizontal positions. Automatic movement of the bolts to the dotted line positions indicated at 46 is accomplished by connecting the upper ends of the bolts to a toggle 47 that is pivoted at its center, as indicated at 48, to a plunger 49 which is reciprocable in a fluid pressure actuated device 50. When the plunger 49 is moved upwardly by fluid pressure, the links of the toggle assume the positions indicated at 51 which of course draws the upper ends of the bolts toward each other and the lower ends thereof out of engagement with the ends of the beams 41 on the lower crown plate. A reverse movement of the plunger throws the lower ends of the bolts into the slots in the ends of the lower beam 41. One fluid pressure actuated device may be used for operating all of the bolts by connecting the upper ends of the bolts at each side by means of a bar or the like indicated at 52 in Fig. 1. Thus when the fluid pressure actuated device is operated, the upper ends of all the bolts are moved simultaneously.

Now as best shown by Figs. 5 and 6, each of the mold sections or decks comprises a rectangular frame 60 reinforced at the corners by gusset plates 61. Upper and lower sides of the frame are closed by rubber diaphragms 62 and 63 respectively and for tightly and positively securing the edges of the diaphragms to the frame, a rectangular retaining element 64 composed of metal for example is provided which is secured to the frame by means of screws 65. Closing the upper and lower sides of the sections by rubber diaphragms provides a hollow construction into which fluid under pressure may be introduced and it will be apparent that when this fluid is introduced the diaphragms will tend to expand in upper and lower directions respectively.

In the construction illustrated, a thin metallic plate 66 covers the upper diaphragm and is secured to the deck frame by the bolts 65. A hard rubber mold form indicated at 68 is disposed on the upper surface of the plate 66 and is secured thereto by telescopic screws 69 and on the upper surface of the mold form and around the edge portion, a metal cut-off form 70 is disposed which is also secured in place by the screws 69. The form 70 delineates the outer boundary of the mat which is indicated at 71. It should now be appreciated that the diaphragm at the upper side of each of the movable decks carries a mold form 68 upon which the mat to be vulcanized is disposed, and a cut-off ring 70 which delineates the outer boundary of the mat. When the mold sections or decks are brought together, and steam under pressure is introduced thereinto, it is apparent that the lower diaphragm of each deck will be pressed against the mat 71 on the deck below it and that the upper diaphragm in the latter will be forced upwardly or rather will be subjected to a balancing pressure so that the lower diaphragm will apply pressure to the mat while the upper diaphragm will hold the parts against downward movement. It will be appreciated that the upper crown plate and deck will have only a lower diaphragm and that the lower crown plate and deck will have only an upper diaphragm, although these decks separated from the crown plates may be provided with a second diaphragm and interchanged with any of the intermediate decks.

In applying the unvulcanized mat, its thickness preferably will correspond to the thickness of the cut-off form 70 so that there will be no tendency for rubber to flow over the form 70. It should be appreciated in this connection that the pressure on the mat will be uniform and there will be practically no tendency to force rubber over the edge of the cut-off form as the pressure on both sides of the junction line will normally prevent any sidewise movement of the rubber.

As best shown by Figs. 1 and 3, steam under pressure is introduced into the mold sections or decks through a manifold 72 and individual lines as indicated at 73 extending respectively to the decks. Each of the lines 73 may comprise a plurality of swivel joints so as to permit pivotal movement of each of the decks without interference with the steam line connections and as best shown by Fig. 3, the lines 73 are arranged in staggered relation at opposite sides of the manifold 72 so as to prevent interference. The outlet manifold for the steam indicated at 74 is of similar construction and the individual lines are indicated at 75, each of which is connected to a lower point on the back edge of the deck to facilitate drainage of water therefrom.

Particularly the molding apparatus has been designed to vulcanize and mold a mat 80 such as shown by Figs. 7 and 8 wherein a portion of the mat indicated at 81 is raised to accommodate a part of the transmission or the like which may project above the floor of an automobile. At one side of this raised portion 81, a reversely directed and substantially conical portion 82 is provided which is apertured to provide an opening for accommodating the gear shift lever. In manufacturing the mat the portion 82 is directed reversely to the portion 81 to enable reducing the depth of the deck form as much as possible and then after the mat is removed, the portion 82 may be reversed and disposed in the broken line position indicated at 83. The angularity of the side wall of the portion insures that it will maintain its reversed position.

The plate 66 and the mold form 68 may have a contour corresponding to the mat shown by Figs. 7 and 8 and when steam is applied to the decks the upper diaphragm 62 will expand and conform to the contour of the plate while steam in the upper deck will cause the lower diaphragm to force the mat material 71 into the depressions and other parts of the mold form 68 so that at the finish of the molding operation the mat has a preformed contour corresponding to the form 68.

Figure 9:
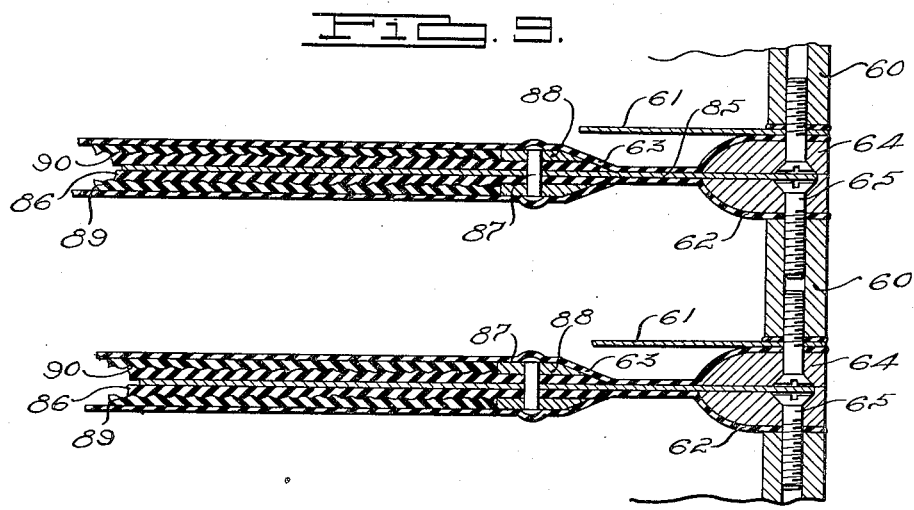
Fig. 9 is a cross-sectional view similar to Fig. 6, illustrating a different form of the invention.

In the construction shown by Fig. 9, a plate 85 is employed which is separable from both diaphragms 62 and 63 and this plate has a mold form 86 on either side thereof. Bolts 87 may be used to secure the mold forms to the plate and also to the hold cut off forms 88 around the edge portions of the mold forms. Two mats 89 may be vulcanized simultaneously between each pair of diaphragms 62 and 63 and if desired, the mold forms may have a suitable embossing or design as indicated at 90 to provide a similar surface design to the mats. This type of construction preferably is employed in the manufacture of flat mats. Insertion and removal of the mats is accomplished by separating the decks and then removing the plate and mold form assembly from between the diaphragms or the assembly could be pivoted at one edge to one of the deck sections and separated from the latter by pivotal movement.

Figure 10:
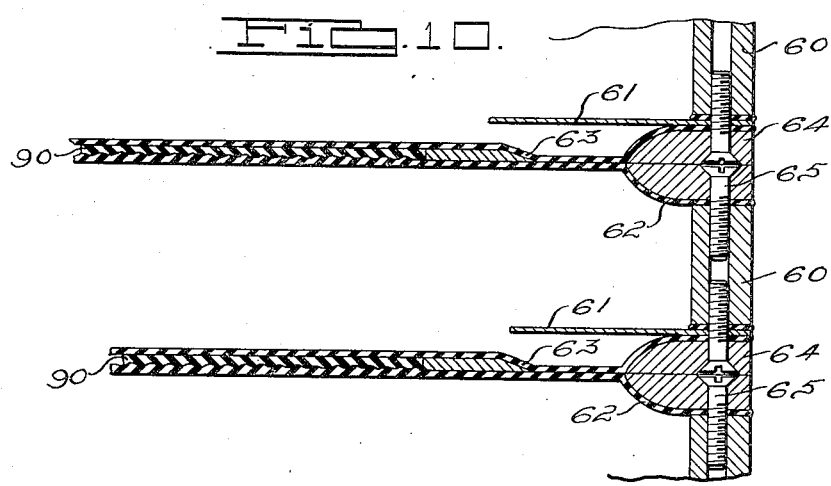
Fig. 10 is a similar cross-sectional view of another form of the invention.

In the construction shown by Fig. 10, the mat indicated at 91 is disposed directly between the diaphragms and one of the latter may have an embossing or design to provide a desired surface contour on the mat.

In any of the constructions illustrated it will be appreciated that a suitable lubricant such as soapstone may be used between the diaphragms, mat and mold forms to prevent adhesions.

Owing to the use of fluid pressures of substantially counterbalancing character in the adjacent decks, it is apparent that where a mold form is used, it may be relatively thin as it does not have to withstand any substantial deforming or breaking stresses. These counterbalancing pressures also enable vulcanizing a mat directly between the diaphragms in the manner shown in Fig. 10.

It will be appreciated therefore that a very light mold form may be used as it is supported by the fluid pressure in the deck on which it is mounted. Moreover while the thin plate 66 is shown with single or double mold forms, it is practical to use the plate as a mold form for vulcanizing one mat or a mat on both sides of the plate. This plate could be constructed of metal, fairly stiff rubber or other suitable material. In different cases where the principles of the invention may be utilized, it will be evident that an extremely heavy, bulky and expensive support for the article to be vulcanized is not required owing to the fact that it is subjected to substantially counterbalancing pressures at its opposite sides.

Assuming that the decks are in the lower and broken line positions indicated at 25 in Fig. 1, the operator places a mat on the upper diaphragm in the upper movable deck and then lifts it to its upper position and latches it to the fixed section 26. Similarly, the other decks are provided with unvulcanized mats and separately lifted into their latched positions. Then a mat is placed on the lower deck 17 and the plunger 19 is actuated to raise it to the oblique position. Then the bolts 40 are applied to positively hold the decks together and steam is introduced thereinto. After the vulcanizing operation, the lower deck 17 is moved to its lower position and the mat or mats removed therefrom and then the other decks are individually moved downwardly and the mats removed therefrom until all of the movable decks are in the broken line positions. Arrangement and operation of the decks in the manner described provides considerable room or space for insertion and removal of the mats and this is of importance in that it enables the operator to insert and remove the mats more rapidly and more efficiently.

The construction shown by Figs. 11 and 12 is generally similar to the apparatus already described but in this construction only four decks 15 are shown. The uprights at the forward ends of the decks are generally similar to the uprights 11 although the slots are arcuate as indicated at 100 and the decks are pivotally connected to the rear uprights 101 similarly to the pivotal mounting of the decks shown by Fig. 1 excepting that a smaller number of slots and pins are required owing to the lesser number of decks. The crown plates are provided with spaced channels 41 and 42 as previously described in connection with Fig. 1 but a different mechanism is used to manipulate the bolts 40 employed for holding the crown plates together during the curing operation. In this case the upper ends of the bolts at each side of the apparatus are threaded through plates 101 and through nuts 102 rigidly secured to the plates 101 such as by welding along the line indicated at 103. Beyond the nuts 102 lock nuts 104 are threaded on the ends of the bolts.

Now as best shown by Fig. 12 the plates 101 are pivotally connected to plungers 106 projecting into a fluid pressure cylinder 107 wherein the rods are respectively connected to pistons 108. Fluid under pressure may be introduced to the central part of the cylinder 107 through a conduit 109 and when so introduced, the plungers and plates 101 will be forced in opposite directions so as to move the bolts 40 laterally beyond the ends of the channels 41 and 42 thereby permitting movement of the decks 15 to the lower and dotted line positions. It may be mentioned that the plates 101 slidably move on the upper surfaces of the channels 41 and 42 and are supported thereby during reciprocatory movement of the plates. This arrangement is distinguished from that previously described principally in that the bolts are not pivotally moved in separating them from the channels 41 and 42 but instead are moved beyond the ends of the upper and lower channels by a direct lateral movement. It may be mentioned that the plates 101 have openings 110 for accommodating the cables 30.

The manifolds 72 and 74 are connected to the rear edges of the decks respectively by flexible conduits 111 and 112 and the exhaust conduits are connected to lower portions of the decks so as to facilitate drainage of any water collecting therein. In other respects the construction shown by these figures is substantially the same as shown by Fig. 1 and manipulation of the apparatus and insertion and removal of the mats is accomplished in much the same way. The construction of the decks shown in these figures may be substantially identical to that shown by Figs. 6, 9 and 10 so that in general the operation of the molding apparatus may be the same as previously described.

While specific reference has been made to vulcanizing mats, it should be understood that articles of different character may be molded or vulcanized and that the curing of mats is only illustrative of the use of the invention. The rubber diaphragms efficiently lend themselves to molding or vulcanizing articles of different contour as will be readily understood. It is possible also to vulcanize rubber to a metal running board or the like by placing the parts to be vulcanized together between the diaphragms. It is also possible to provide one or both diaphragms with form-retaining portions or members such as at its center to obtain a localized pressure in vulcanizing or molding an article between the diaphragms or an article disposed partially or wholly between one diaphragm and the form retaining portion of the other. It is also possible to provide form retaining elements on one or both diaphragms for the purpose of forming openings or contoured portions of the article to be vulcanized or molded. It should be apparent that the diaphragm construction has a wide range of usage in forming and molding articles and particularly forming and vulcanizing articles constructed of rubber and that those skilled in the art will readily appreciate the various uses to which the apparatus may be subjected.

Use of the diaphragm construction enables eliminating trim from articles vulcanized which usually occurs in ordinary vulcanizing operations where platens are used and which force excess rubber into a trim along the edge of the article which subsequently must be removed. While there may be slight variations in the quantity of rubber used, no trim results as the action of the diaphragm eliminates the formation of any trim around the edge of the article being vulcanized. In this connection it may be mentioned that the cut-off forms 70 may in fact be eliminated and in this case the diaphragm naturally closes in around the edge of the article and thus provides a stop to prevent lateral expansion of the rubber. The cut-off form enables securing particular edge faces on the article vulcanized but it is quite possible to eliminate this cut-off form and obtain desirable edge contours without increasing the area of the article.

Although more than one form of the invention has been illustrated and described in detail, it will be apparent to those skilled in the art that various modifications may be made without departing from the scope of the appended claims.

What is claimed is:

1. A molding apparatus comprising upper and lower relatively movable crown plates, a plurality of decks disposed in superposed relation between the crown plates, and means pivotally mounting the decks and one of the crown plates for pivotal movement between two angularly related positions wherein the decks are substantially parallel and superposed in either position.

2. A molding apparatus comprising a frame, an upper crown plate, a plurality of decks pivotally mounted on the frame for individual movement into upper positions substantially parallel to the crown plate or positions angularly related thereto, means substantially counterbalancing each deck against gravitational movement, and latching means for holding the decks in their upper positions but allowing individual movement thereof in sequential order.

3. A molding apparatus comprising a frame, a plurality of movable decks movable between upper and lower, angularly related positions with the decks substantially parallel in either position, and means on the frame and decks including guide slots and elements movable in the slots for guiding the decks between the two positions.

4. A molding apparatus comprising a plurality of decks, means movably supporting the decks so that they may individually be separated, bolts at opposite sides of the decks for holding them together, means on the upper and lower deck adapted to cooperate with the bolts when the latter are moved laterally toward the sides of the decks for locking the latter together, and means for moving the bolts in locking and unlocking the decks.

5. A molding apparatus comprising a plurality of decks, means movably supporting the decks so that they may individually be separated, bolts at opposite sides of the decks for holding them together, means on the upper and lower deck adapted to cooperate with the bolts when the latter are moved laterally toward the sides of the decks for locking the latter together, and means for moving the bolts in locking and unlocking the decks, said means comprising reciprocatory members for moving the bolts at opposite sides in directions opposite to each other.

6. An apparatus for molding articles, comprising a plurality of separable stacked decks of hollow construction, deformable members closing opposite sides of each of said decks, and a mold form interposed between the deformable members associated with consecutive ones of said decks, the articles to be molded being received between said mold forms and one of said last mentioned deformable members and means for introducing fluid under pressure into the hollow decks.

7. An apparatus for molding articles, comprising a plurality of separable stacked decks of hollow construction, a pair of enclosing deformable members individual to each of said decks and forming walls between the successive decks, a mold form individual to each of said decks and interposed between a deformable member of the associated deck and an adjacent deformable member of an adjacent deck, the article to be molded being interposed between one of said last mentioned deformable members and said mold member and means for introducing fluid under pressure into the hollow decks.

8. Apparatus for molding articles, comprising a plurality of separable stacked decks of hollow construction, a pair of deformable members individual to and secured to each of said decks and forming separating walls between the respective decks, a mold form individual to each of said decks and secured to the associated deck externally of one of the deformable members associated therewith, the articles to be molded being interposed between said mold members and an adjacent deformable member associated with an adjacent deck and means for introducing fluid under pressure into the hollow decks.

9. An apparatus for molding articles, comprising a plurality of separable stacked decks of hollow construction, a pair of enclosing deformable members individual to each of said decks and secured at opposite sides thereof to form enclosing walls between said decks, a relatively rigid mold member contoured to conform to the desired article interposed between adjacent deformable members associated with adjacent decks, the articles to be molded being interposed between said mold members and adjacent deformable members and means for introducing fluid under pressure into the hollow decks.

10. Apparatus for molding articles comprising a plurality of separable stacked decks of hollow construction, a pair of enclosing deformable members individual to each of said decks and secured at opposite sides thereof to form separating walls between said decks, a relatively rigid mold member contoured to correspond to the desired article and secured externally of a deformable member associated with the corresponding deck, an article to be molded being interposed between said mold member and the adjacent deformable member of an adjacent deck, and means for introducing fluid under pressure into the hollow decks whereby the deformable members between which said article and said mold members are secured act respectively to apply a molding pressure to said article and to apply a balancing pressure to said mold member.

11. Apparatus for molding articles comprising a plurality of separable stacked decks of hollow construction, a pair of enclosing deformable members individual to each of said decks and secured at opposite sides thereof to form separating walls between said decks, a double faced mold member adapted to be interposed between adjacent deformable members associated with adjacent decks, one article to be molded being interposed between one face of said mold member and one of said last mentioned deformable members, another article being interposed between the opposite face of said mold member and the other of said last mentioned deformable members and means for introducing fluid under pressure into the hollow decks.

12. Apparatus for molding articles comprising a plurality of separable stacked decks of hollow construction, a pair of enclosing deformable members individual to each of said decks and secured at opposite sides thereof to form separating walls between said decks, a relatively rigid mold member having opposite faces contoured to conform to the desired article adapted to be interposed between adjacent deformable members associated with adjacent decks, the assembly being adapted to receive one article to be molded between one face of said mold member and the adjacent deformable member and to receive another article to be molded between the other face of said mold member and the adjacent deformable member and means for introducing fluid under pressure into the hollow decks.

13. A molding apparatus comprising upper and lower relatively movable crown plates, a plurality of decks disposed in superposed relation between the crown plates, means pivotally mounting the decks and one of the crown plates for pivotal movement between a tilted operating position and a loading position, and fluid pressure connections for said decks including drainage connections introduced therein adjacent the side of each deck which is lowest when in operating position.

14. In molding apparatus, a plurality of decks supported in superposed relation for swinging movement relative to each other between two positions, means for consecutively swinging the decks in timed relation to each other between said positions, a flexible diaphragm at the side of each deck facing the next adjacent deck, a contoured form on the said next adjacent deck facing the flexible diaphragm and cooperating with said diaphragm in one relative position of the decks to receive a sheet of material to be molded therebetween, and means for introducing fluid under pressure into each of the decks to expand the diaphragm against the sheet of material supported on the contoured form.

HARRY M. PRYALE.
SAMUEL C. CLARK.